April 5, 1932.   H. SCHLAICH   1,852,982
TEMPERATURE INDICATING SYSTEM FOR INTERNAL COMBUSTION ENGINES
Original Filed March 6, 1916
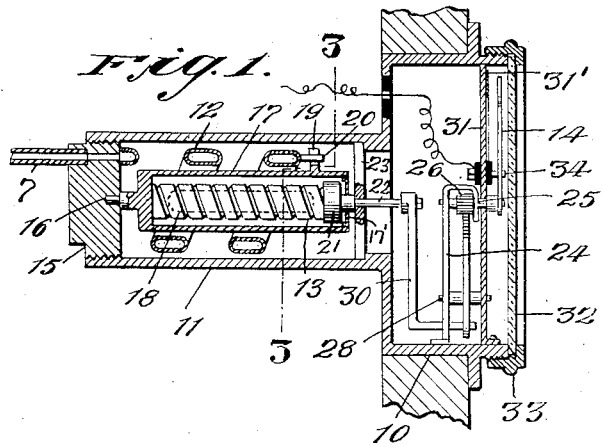
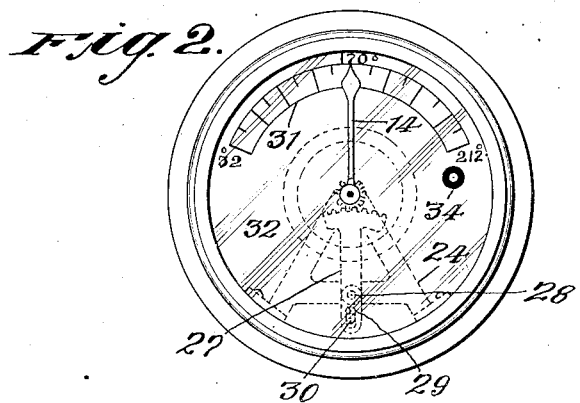
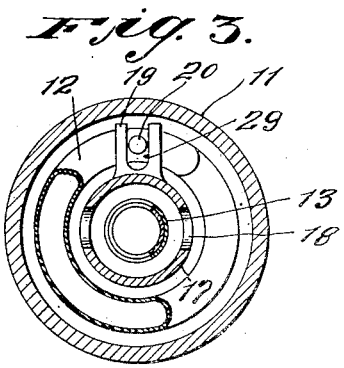 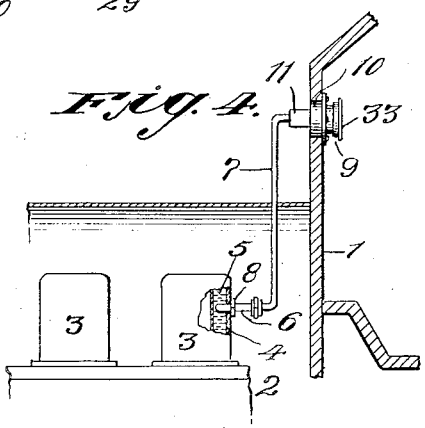
INVENTOR
Herman Schlaich
BY
ATTORNEYS Patented Apr. 5, 1932

1,852,982

UNITED STATES PATENT OFFICE

HERMAN SCHLAICH, OF LONG ISLAND CITY, NEW YORK

TEMPERATURE INDICATING SYSTEM FOR INTERNAL COMBUSTION ENGINES

Original application filed March 6, 1916, Serial No. 82,518. Divided and this application filed September 26, 1922. Serial No. 590,567.

My invention relates to a temperature indicating system adapted for use in connection with internal combustion engines; and it comprises a thermometer, or similar temperature indicating device designed especially to be mounted on the dashboard of conveyances propelled by such engines, and arranged so that the driver may keep himself informed of the condition of the medium by which such engines are cooled.

It is the primary object of my invention to provide a combination of elements which will show the temperature of the medium employed to cool an internal combustion engine, with absolute accuracy regardless of the influence of the atmosphere and other external factors; and I achieve this result by means of parts which are so controlled that the action thereof will always be reliable, whether the surroundings of the engine be hot or cold; and therefore be capable of giving a true and exact indication of the real state of the cooling medium.

The present application constitutes a division of my co-pending application Serial No. 82,518, filed March 6, 1916, for temperature indicating system for internal combustion engines, now Patent No. 1,430,688 dated Oct. 3, 1922.

On the drawings which show an embodiment of the principle of my improvement;

Figure 1 illustrates a longitudinal section of a thermometer to be carried by the dashboard of an automobile or the like, in the practice of my invention;

Figure 2 is a front view of such a thermometer;

Figure 3 is a cross section taken on the line 3—3 of Figure 1; and

Figure 4 is a somewhat diagrammatic view showing my invention as applied to the engine by which the automobile or the like is driven.

The same numerals of reference are made use of in connection with the same parts throughout.

To describe my invention in detail, I employ the numeral 1 to indicate a suitable support, such as the dashboard of an automobile, of example; located in proximity to an internal combustion engine 2, having one or more power cylinders 3, provided with a jacket 4 to enclose a cooling chamber 5. To this chamber the water or other cooling agent will be supplied by suitable conduits, and conveyed therefrom to the usual radiator, not shown, at the front of the car, to be treated after absorbing part of the heat of combustion during passage through the chamber 5. The jacket 4 constituting the outer wall of this chamber will have a threaded opening therein to receive a tube 6, that is united to a temperature-indicating device, which will presently be discussed in full, on the dashboard 1, by a conduit 7. A lock nut 8 will secure the tube 6 in proper position on the jacket 4, and the tube and conduit will be connected by any type of union coupling now in common use. The temperature indicating device or thermometer is identified as a whole by the numeral 9, and various parts thereof are arranged to co-operate in a manner that will give the required effect above referred to.

The mechanism of the thermometer is housed in a suitable casing comprising a relatively large section 10, received in an aperture of the dashboard 1; and having a flange for the fastening screws; and a smaller section or projection 11 which extends back of the dashboard 1 and contains a hollow metallic tube 12, shaped like a spiral which is sufficiently flexible and elastic to expand in response to internal pressure and to contract when such pressure is relaxed. This coil communicates at one end with the conduit 7, and is connected at its opposite end to a bi-metallic spiral coil 13. The coil 13 consists of a pair of superposed strips, one of brass and the other of nickel steel, with the latter on the inside. Both tubes 6 and 12, together with the connecting conduit 7, will be filled with a suitable expansible liquid, such as alcohol, glycerine, etc., and when the cooling medium gets heated the effect will of course be to cause the tube 12 to distend or unwind to a certain extent. The coil 13 will also respond to changes in temperature; but is so mounted that when heated, it will oppose the effect on the pointer of the expansion or tendency to unwind of the coiled tube 12.

In this fashion variations in the temperature of the surrounding air will be neutralized; and the action of the tube 12 regulated; so that a given variation in the temperature of the cooling medium will always produce a constant degree of movement of a pointer or index member 14, which is operated by the joint action of the tube 12 and coil 13. Consequently the pointer 14 will be truly responsive to the conditions of the cooling medium, and the influence of other factors eliminated.

For closing the outer end of the projection 11, I screw into it a plug 15 having a central opening on its inner face to serve as a bearing for a journal 16 of a sleeve 17. This sleeve encloses the coil 13 and is provided with openings or windows 18 in its opposite sides, through which the coil 13 can be plainly discerned. At its end near the journal or trunnion 16, the sleeve is of course closed; but its other end is open and on its outer surface adjacent the the open end, the sleeve has a slotted projection 19 to receive a short arm 20 on the adjacent end of the spiral tube 12. The tube 12 and coil 13 thus have a loose connection which permits axial movement of the one relative to the other. I anchor the coil 13 to the end of the sleeve adjacent the journal 16, and the opposite end of the coil is fastened to a bushing 21, received in the open end of the sleeve and free to move therein; and from this bushing towards the section 10 extends a shaft 22. A plate 23 having a bearing in line with the bearing for the journal 16, in the section 11 adjacent the section 10, rotatably supports the shaft 22. A spider 17' journalled on shaft 22 and fitting the open end of the sleeve 17 supports the open end of the sleeve 17.

Inside the section 10 of the casing and projecting from the side thereof are arms 24 which meet and form a bearing alined with the shaft 22 for a spindle 25, which carries the pointer 14. This spindle also carries a gear 26, which is actuated by a curved rack on a lever 27 pivoted to the arms 24 between the shaft 25 and the side wall of the section 10, by means of a pin providing trunnions 28. Between this pin 28 and the surface of the section 10 the lever 27 has a slot 29 receiving the end of a crank 30 on the shaft 22. The section 10 may carry a dial 31 with graduations marked thereon behind the pointer 14; and the front end of the casing may be closed by a glass face 32, held in position by a flanged ring 33 arranged to be screwed on the section 10. When the casing is mounted the arms 24 will be vertical.

The operation of my invention will now be explained. The various parts will be so fitted and connected that so long as the temperature of the water, or other cooling medium for the engine, is about 170° F. the pointer 14 will take a position in the middle of the scale 31, as portrayed in Figure 2. If the cooling medium becomes hotter, the fluid in the tube 6, conduit 7 and tube 12 expands; and the pointer, as the tube 12 distends, will move over to the right. On the other hand, if the temperature of the cooling medium drops, the pointer will move to the left.

By the instrumentality of the thermostatic element or coil 13, the influence of atmospheric temperature and other disturbing factors is neutralized; and compensation is automatically made for variations in the action of the tube 12. It will be obvious that on a cold day a given rise in the temperature of the cooling medium would not produce the same movement of the pointer as on a warm day. This is because the temperature of the surrounding air materially affects the tube 12, as well as does that of the cooling medium, and the motion of the pointer is produced by both. The coil 13, however, is so designed that it will contract, or roll up, upon a rise in temperature, and its action is therefore the reverse of that of the tube 12. Therefore the higher the outside temperature and the greater the tendency of the tube 12 to expand, the greater will be the counter effect of the coil 13. Consequently the movement of the pointer 14 will always be uniform and a direct function of the condition of the cooling medium.

If desired I may locate an electric terminal 34 at the high temperature end of the scale 31', to be touched by the pointer 14 when the cooling medium becomes heated to a predetermined temperature. To this terminal may be connected a wire leading to the main conductor joined to the proper terminal of the source of electric current for the ignition system. Hence when the pointer makes contact with the terminal 34 the source of current will be short-circuited and the operation of the igniters of the engine interrupted. As a result the engine cannot continue running, but must slow down and stop till the cooling medium is restored to proper condition; and damage averted even though the operator be too careless to heed the pointer 14.

The connection above detailed between the shaft 22 and the pointer 14 is especially useful when the projection 11 is eccentric with respect to the section 10. When the sections 10 and 11 are co-axial, as illustrated, the shaft 22 may be extended and the pointer 14 placed directly thereon, as the shafts 22 and 25 are shown in line with each other. By my invention the operator will always be enabled to give the engine proper attention and anticipate disorders. It can be employed not only on conveyances, but also on stationary engines, and might be utilized when such engines are cooled by some other medium, even by air, without change of principle or material alterations in structure.

It will be seen from the above that my improvement is simple and easily made, yet perfectly reliable in operation. While the construction disclosed herein is preferable, I reserve the right to make changes therein as respects the shape, size and arrangement of parts, within the scope and spirit of my invention as defined in the claim appended hereto.

What I claim is:

An indicator comprising a dial and a pointer associated with said dial, in combination with a temperature responsive element connected to said pointer, and a pressure responsive element encircling said temperature responsive element having a loose connection therewith, said first-named element being designed to contract upon increase of temperature and said second-named element being designed to expand upon increase of pressure.

In testimony whereof, I have affixed my signature to this specification.

HERMAN SCHLAICH. [L. S.]